US008459724B2

(12) United States Patent
Tsumiyama et al.

(10) Patent No.: US 8,459,724 B2
(45) Date of Patent: Jun. 11, 2013

(54) UTILITY VEHICLE

(75) Inventors: Yoshinori Tsumiyama, Lincoln, NE (US); Chad Enger, Lincoln, NE (US)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 295 days.

(21) Appl. No.: 12/980,243

(22) Filed: Dec. 28, 2010

(65) Prior Publication Data

US 2012/0161427 A1 Jun. 28, 2012

(51) Int. Cl.
*B60J 10/00* (2006.01)

(52) U.S. Cl.
USPC .......................................... 296/146.9

(58) Field of Classification Search
USPC .......................... 296/146.9; 49/394; 292/216
See application file for complete search history.

(56) References Cited

U.S. PATENT DOCUMENTS

2008/0093883 A1 * 4/2008 Shibata et al. ............ 296/146.9

FOREIGN PATENT DOCUMENTS

JP 2009-243189 A 10/2009

* cited by examiner

*Primary Examiner* — Joseph Pape
(74) *Attorney, Agent, or Firm* — Alleman Hall McCoy Russell & Tuttle LLP

(57) ABSTRACT

A utility vehicle includes a vehicle body including a main frame, a seat, and an entrance, and a door including a door body, a hinge, and a latch device. The latch device includes a striker member mounted to the vehicle body to protrude outward in a vehicle width direction, a latch member attached to the door body and actuated to switch between a first state where the latch member engages with the striker member and a second state where the latch member disengages from the striker member, and an operation member attached to the door body to operate the latch member. The operation member is positioned on an outer surface of the door body in the vehicle width direction.

5 Claims, 14 Drawing Sheets

UTILITY VEHICLE

BACKGROUND OF THE INVENTION

1. Field of the Invention

The present invention relates to a utility vehicle including doors provided with latch devices.

2. Description of the Related Art

An exemplary utility vehicle including doors provided with latch devices is disclosed in Japanese Laid-Open Patent Application Publication No. 2009-243189. In this utility vehicle, the latch device includes a striker member provided at a vehicle body, a latch member provided at an upper end portion of the door at an inner side in a vehicle width direction, and a lever provided at the upper end portion of the door at the inner side in the vehicle width direction such that the lever and the latch member are arranged side by side. The latch member is engaged with the striker member to lock the door. When the user operates the lever to actuate the latch member, the door is unlocked. In this prior art, since a single lever is operated from both sides of the door, i.e., outside and inside of the door, a structure of the latch device can be simplified. However, since the lever is provided at the upper end portion of the door at the inner side in the vehicle width direction, the user seated on the seat has to bend the user's arm unnaturally to operate the lever. Thus, the user cannot operate the lever easily. It is desired that the user seated on the seat operate the lever easily.

SUMMARY OF THE INVENTION

A utility vehicle of the present invention comprises a vehicle body including a main frame to which an engine is mounted, a seat mounted to the main frame, and an entrance through which a user to be seated on the seat gets into and out of the vehicle; a door including a door body for opening and closing a part of the entrance, a hinge for coupling the door body to the vehicle body such that the door body is rotatable around the hinge; and, a latch device for retaining the door body in a state where the door body closes the part of the entrance, the latch device including a striker member mounted to the vehicle body to protrude outward in a vehicle width direction, a latch member attached to the door body and actuated to switch between a first state, where the latch member engages with the striker member, and a second state, where the latch member disengages from the striker member, and an operation member attached to the door body to operate the latch member, the operation member being positioned on an outer surface of the door body in the vehicle width direction.

In such a configuration, since the door body is provided to open and close a part of the entrance, an opening portion for providing communication between an inner space of the door body and an outside space of the door body can be ensured in a remaining region of the entrance. Since the operation member is positioned on the outer surface of the door body in the vehicle width direction, the user seated on the seat can extend his/her hand to the outside space of the door through the opening portion and easily operate the operation member.

The above and further objects and features of the invention will more fully be apparent from the following detailed description with reference to the accompanying drawings.

DETAILED DESCRIPTION OF THE PREFERRED EMBODIMENTS

Hereinafter, embodiments of the present invention will be described with reference to the drawings. The stated directions are referenced from the perspective of a driver riding in a utility vehicle. It is assumed that the utility vehicle is in a stopped state on a road surface substantially parallel to a horizontal plane.

Figure 1:
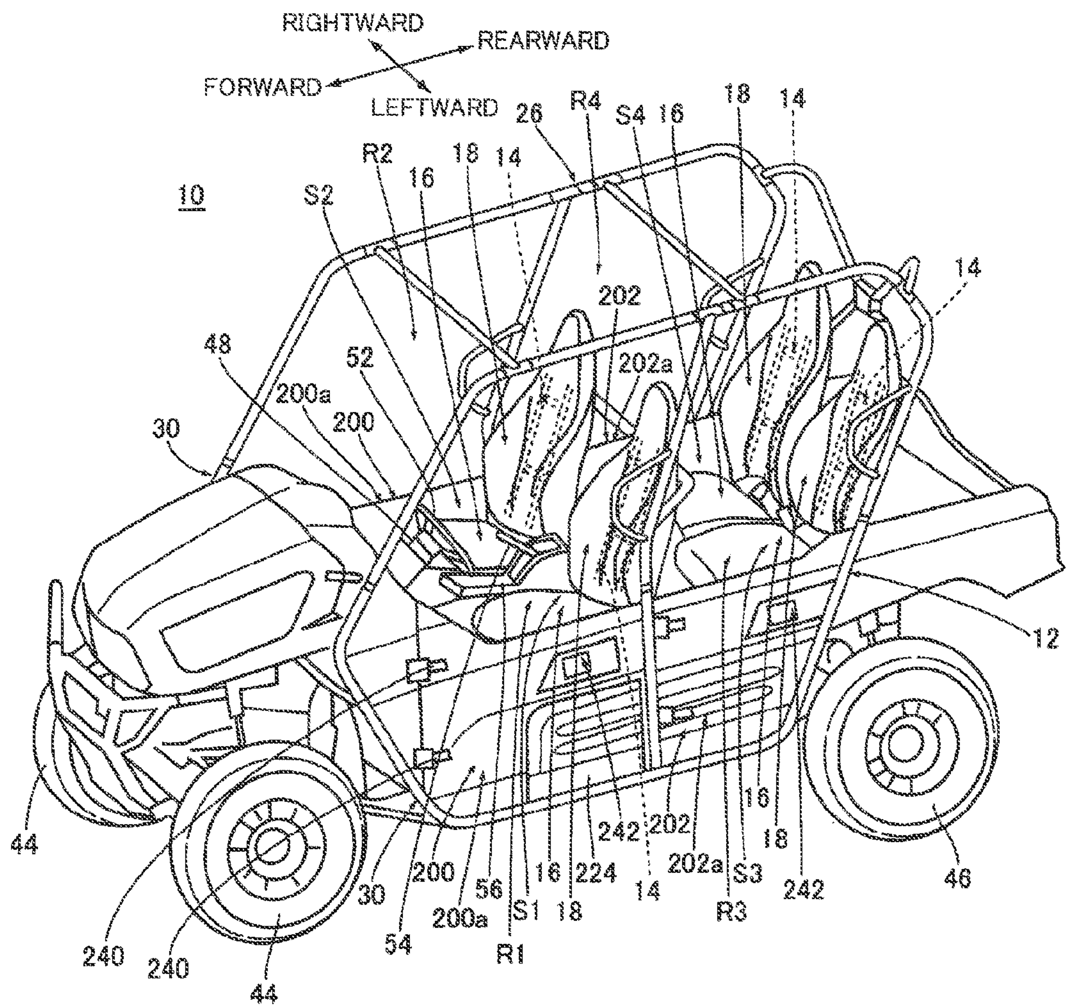
FIG. 1 is a perspective view showing an external appearance of a utility vehicle according to Embodiment 1.
Figure 2:
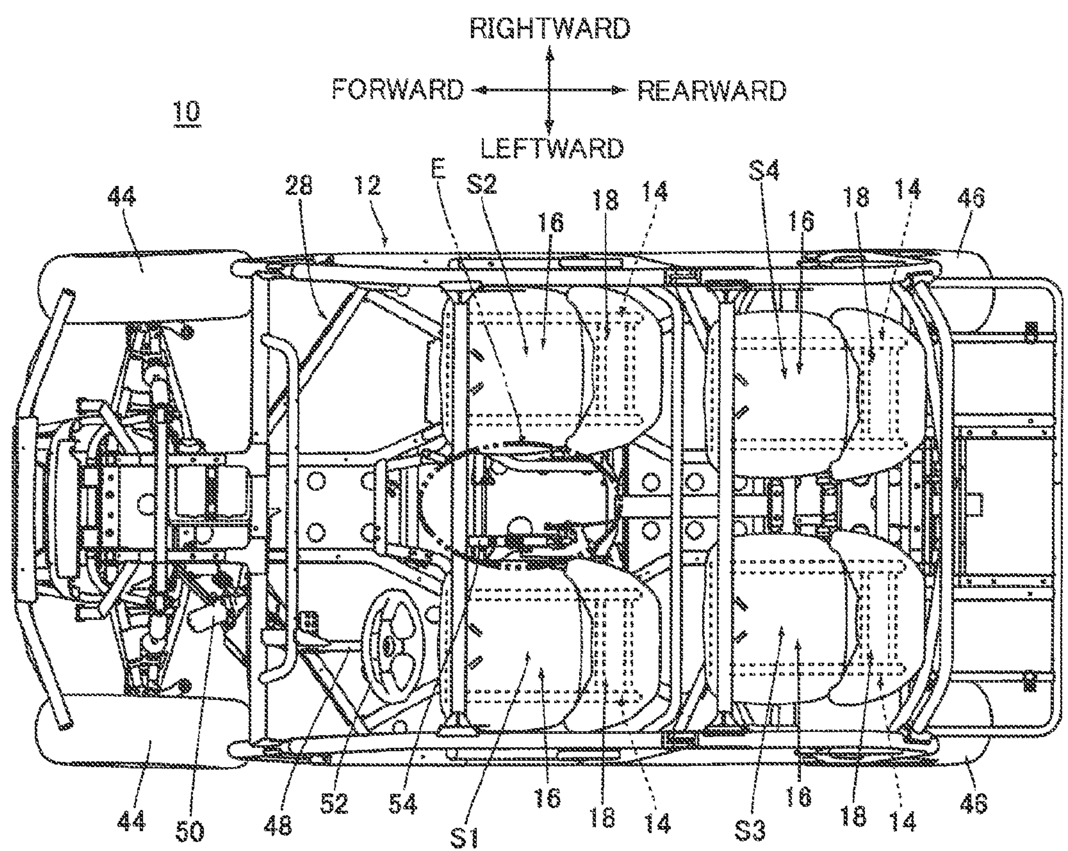
FIG. 2 is a plan view showing a configuration of the utility vehicle according to Embodiment 1.
Figure 3:
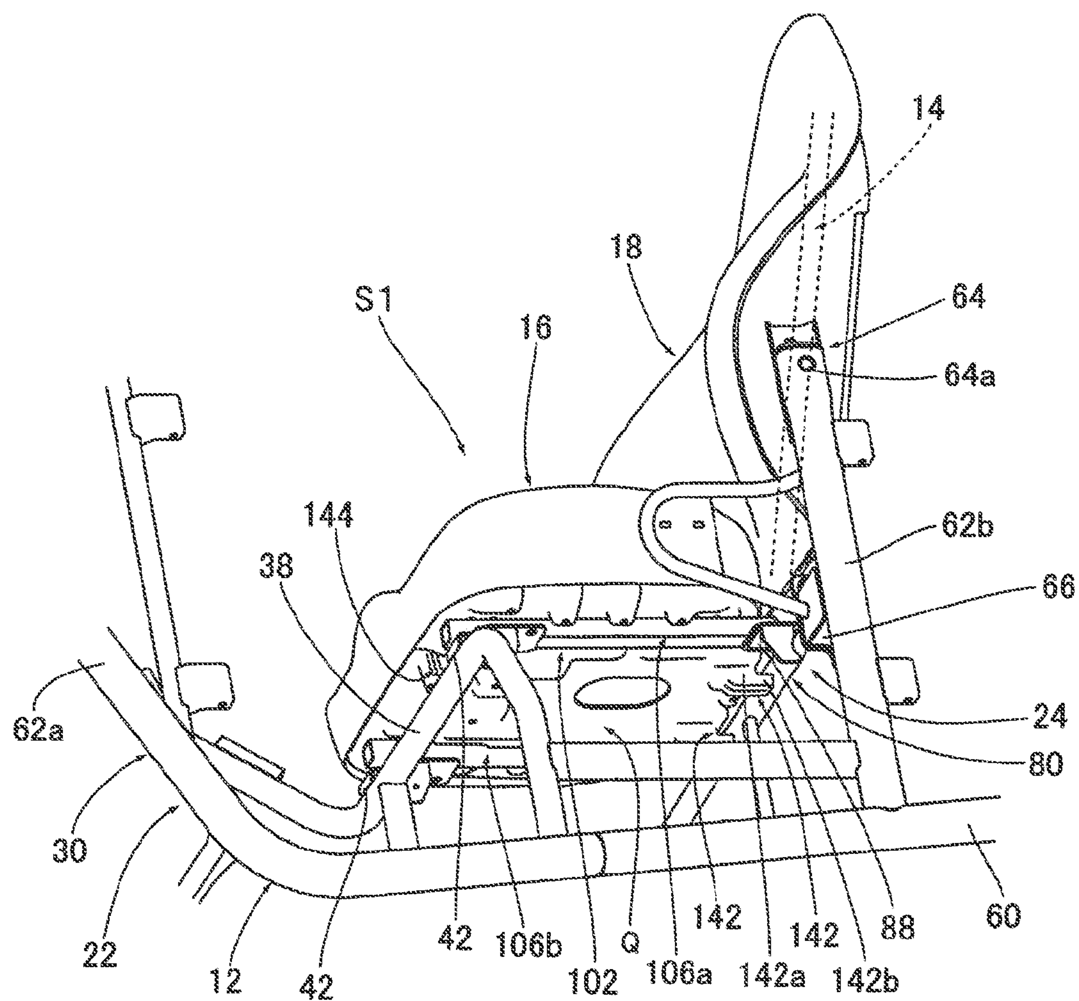
FIG. 3 is a perspective view showing a state where a seat is mounted to a vehicle body as viewed obliquely from below.

FIG. 1 is a perspective view showing an external appearance of a utility vehicle 10 according to Embodiment 1. FIG. 2 is a plan view showing a configuration of the utility vehicle 10. FIG. 3 is a perspective view showing a state where a seat S1 is mounted to a vehicle body 12 as viewed obliquely from below.

Referring to FIGS. 1 to 3, the utility vehicle 10 includes the vehicle body 12, four seat frames 14 mounted to the vehicle body 12, seat bottoms 16 mounted to the four seat frames 14, respectively, and seat backrests 18 mounted to the four seat frames 14, respectively. As shown in FIGS. 1 and 2, each of the four independent seats S1 to S4 on which a user is seated includes the seat frame 14, the seat bottom 16, and the seat backrest 18. In this embodiment, the seats S1 and S2 at the front side are arranged side by side in a rightward and leftward direction, and the seats S3 and S4 are arranged side by side in the rightward and leftward direction, behind the seats S1 and S2, respectively. The seat S1 located at the front side and at the left side is a driver seat. As shown in FIG. 1, the utility vehicle 10 includes two front doors 200 and two rear doors 202.

Figure 4:
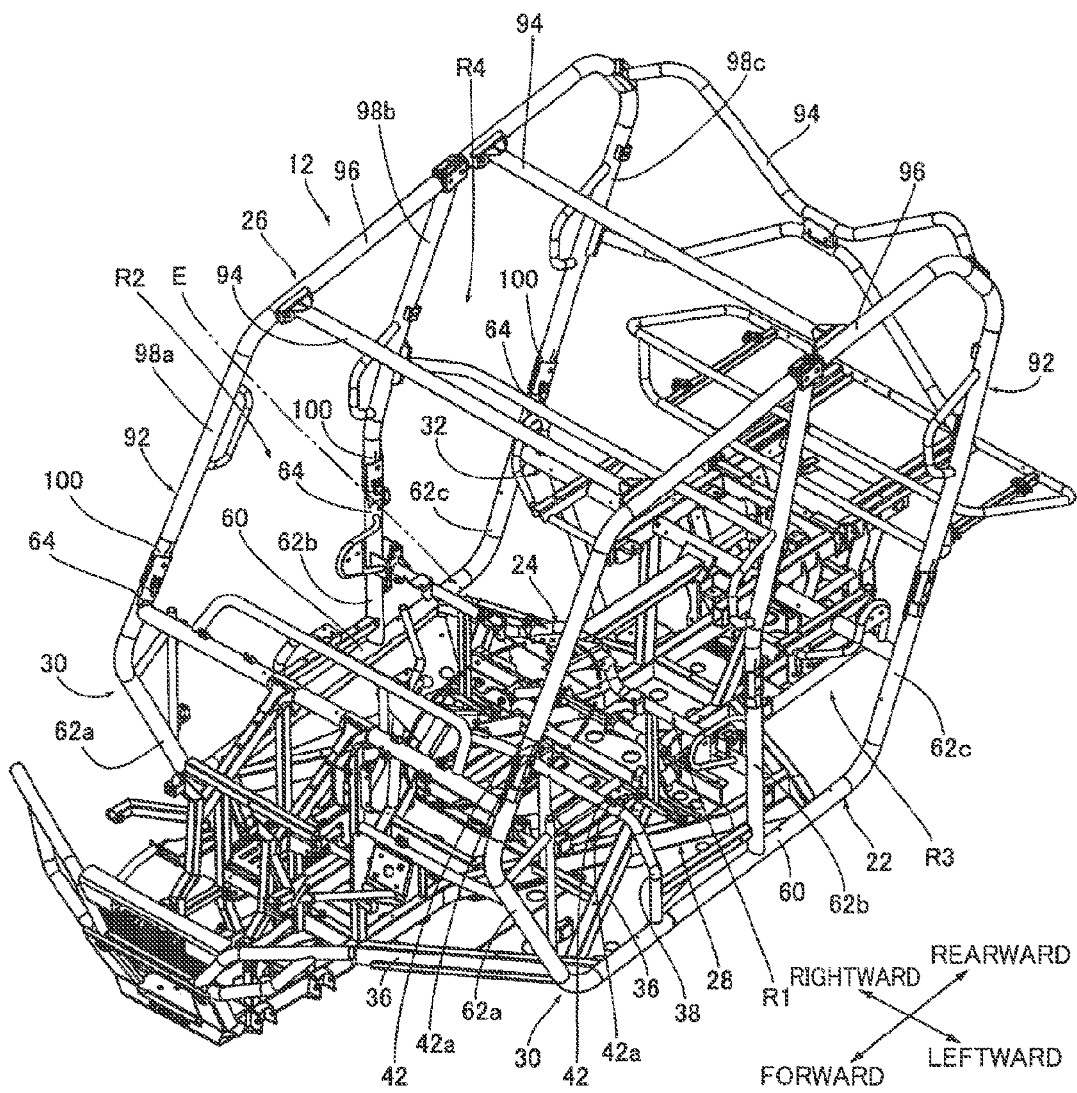
FIG. 4 is a perspective view showing a configuration of a vehicle body.
Figure 5:
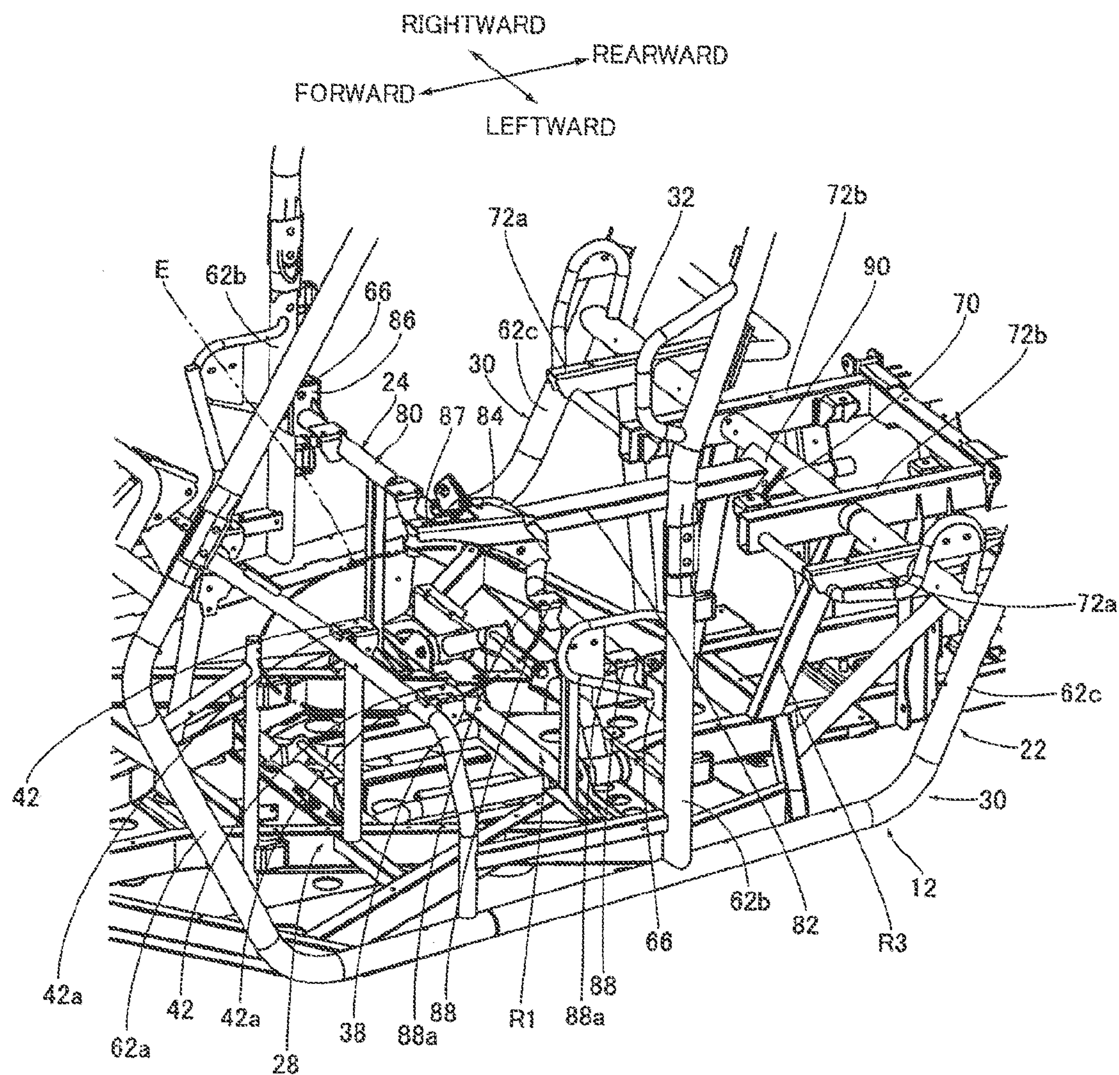
FIG. 5 is a perspective view showing a configuration of a part of the vehicle body.
Figure 6:
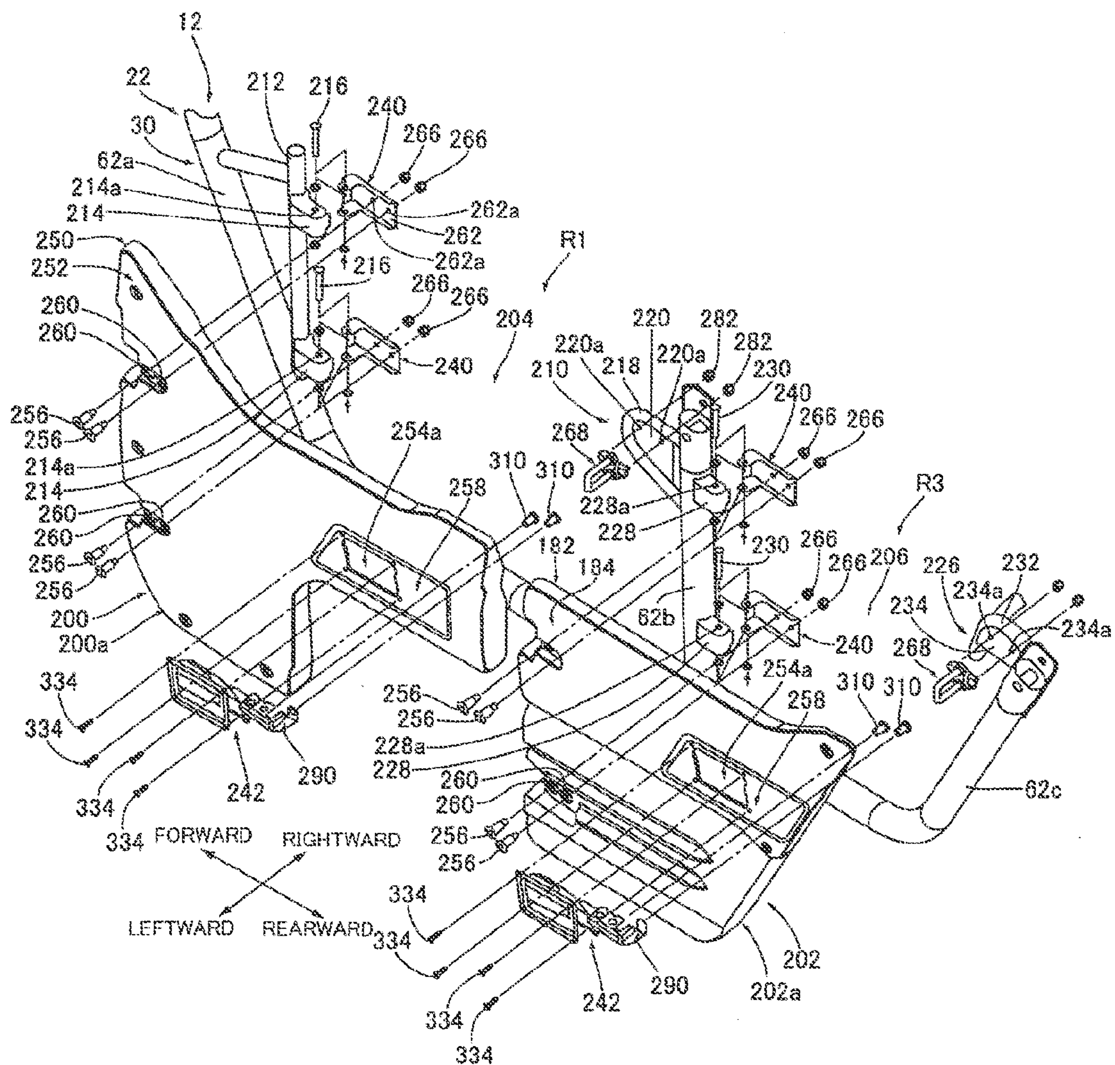
FIG. 6 is a perspective view showing a configuration of a front door, a front door support system, a rear door, and a rear door support system.

FIG. 4 is a perspective view showing a configuration of the vehicle body 12. FIG. 5 is a perspective view showing a configuration of a part of the vehicle body 12. FIG. 6 is a perspective view showing a configuration of the front door 200, a front door support system 204, the rear door 202, and a rear door support system 206. As shown in FIG. 4, the vehicle body 12 includes a main frame 22, a sub-frame 24 for reinforcing the main frame 22, and a cabin frame (ROPS) 26. As shown in FIG. 6, the vehicle body 12 includes two front door support systems 204 for supporting the two front doors 200, respectively, and two rear door support systems 206 for supporting the two rear doors 202, respectively.

As shown in FIG. 4, the main frame 22 includes a floor member 28 which is opposite to the road surface, a pair of lower side members 30 provided at both sides of the floor member 28 in a vehicle width direction (i.e., in a rightward and leftward direction, the same occurs), and a cross member 32 coupling the lower side members 30 to each other.

As shown in FIG. 2, the floor member 28 is a base member configured to support the engine E and the four seats S1 to S4. As shown in FIG. 4, the floor member 28 is constructed in such a manner that a plurality of rectangular pipes 36, extending substantially horizontally, are welded to each other to form a unitary structure. As shown in FIG. 5, at a portion of an upper surface of the floor member 28, corresponding to a front end portion of each of the seats S1 and S2, a substantially arch-shaped support pipe 38 is disposed to extend in the vehicle width direction and configured to support the seat frame 14 (FIG. 2). Each support pipe 38 is provided with two plates 42 arranged to be spaced apart from each other in the vehicle width direction. The plates 42 have holes 42*a* into which the bolts 40 (FIG. 7) are inserted, respectively.

As shown in FIG. 2, two front wheels 44 are suspended from the front portion of the floor member 28, two rear wheels 46 are suspended from the rear portion of the floor member 28, and an engine E is mounted at the center portion of the floor member 28. The four seats S1 to S4 are arranged above the floor member 28 at right and left sides and at front and rear sides. A steering shaft 48 is provided forward relative to the seat S1. An electric power steering device 50 is coupled to a lower end portion of the steering shaft 48. A steering wheel 52 is coupled to an upper end portion of the steering shaft 48. A lever 54 of a parking brake is provided at a right side of the seat S1.

As shown in FIG. 1, each lower side member 30 is configured to support the cabin frame (ROPS) 26, the front door 200 and the rear door 202. As shown in FIG. 4, the lower side member 30 includes a side pipe element 60 extending in a forward and rearward direction at a side portion of the floor member 28 in the vehicle width direction, a first lower pillar pipe element 62*a* extending upward from a front end portion of the side pipe element 60, a second lower pillar pipe element 62*b* extending upward from a center portion of the side pipe element 60 in the forward and rearward direction, and a third lower pillar pipe element 62*c* extending upward from a rear end portion of the side pipe element 60. The side pipe element 60 and the lower pillar pipe elements 62*a* to 62*c* are round pipes, having substantially circular cross-sections. The side pipe element 60 is welded to the rectangular pipe 36 of the floor member 28 at the side portion in the vehicle width direction. As shown in FIG. 3, connecting portions 64 for connecting the cabin frame (ROPS) 26 are provided at upper end portions of the lower pillar pipe elements 62*a* to 62*c* (FIG. 4, FIG. 5), respectively, and a connecting portion 66 is provided at a vertical center portion of each of the second lower pillar pipe elements 62*b* to connect the sub-frame 24.

Referring to FIG. 5, the cross member 32 is a pipe member for coupling third lower pillar pipe elements 62*c* of the pair of right and left lower side members 30. One end portion of the cross member 32 is welded to one of the third lower pillar pipe elements 62*c*, while an opposite end portion of the cross member 32 is welded to the other third lower pillar pipe element 62*c*. The cross member 32 is provided with a connecting portion 70, at a center portion thereof, in a longitudinal direction of the cross member 32. Two support pipes 72*a* and 72*b*, extending in the forward and rearward direction, are provided at portions of the cross member 32 respectively corresponding to the seats S3 and S4 (FIG. 2), to support the seat frame 14 (FIG. 2).

Referring to FIG. 5, the sub-frame 24 includes a cross member 80 extending in the vehicle width direction, and a longitudinal member 82 extending in the forward and rearward direction behind the cross member 80. The cross member 80 is a pipe member for coupling second lower pillar pipe elements 62*b* of the pair of right and left lower side members 30. The cross member 80 has a bent portion 84 at a center portion in the longitudinal direction, such that the bent portion 84 is bent upward in an obliquely rearward direction. Connecting portions 86 are provided at both end portions of the cross member 80, respectively, in the longitudinal direction. The connecting portions 86 are coupled to the connecting portions 66 of the main frame 22, respectively, by bolts and other members which are not shown. A mounting portion 87 for supporting a lever 54 (FIG. 2) of a parking brake is welded to a center portion of the cross member 80 in the longitudinal direction. Two plates 88 are welded to portions of the cross member 80, respectively corresponding to rear end portions of the seats S1 and S2 (FIG. 2), such that the two plates 88 are arranged to be spaced apart from each other in the vehicle width direction. The plates 88 have threaded holes 88*a* into which bolts 40 (FIG. 7) are threadingly engaged. The longitudinal member 82 is a pipe member for coupling the cross member 80 to the cross member 32 of the main frame 22. A front end portion of the longitudinal member 82 is welded to the bent portion 84, and a connecting portion 90 is provided at a rear end portion of the longitudinal member 82. The connecting portion 90 is connected to the connecting portion 70 of the cross member 32 by bolts and the like, which are not shown.

As shown in FIG. 4, the cabin frame (ROPS) 26 includes a pair of right and left upper side members 92 coupled to the pair of right and left lower side members 30, respectively, and a plurality of cross members 94 for coupling the upper side members 92. Each upper side member 92 includes a side pipe element 96 positioned opposite to the side pipe element 60 of the main frame 22, a first upper pillar pipe element 98*a* extending downward from a front end portion of the side pipe element 96, a second upper pillar pipe element 98*b* extending downward from a center portion of the side pipe element 96 in the forward and rearward direction, and a third upper pillar pipe element 98*c* extending downward from a rear end portion of the side pipe element 96. The side pipe element 96 and the upper pillar pipe elements 98*a* to 98*c* are round pipes, having substantially circular cross-sections. Connecting portions 100 are provided at lower end portions of the upper pillar pipe elements 98*a* to 98*c*, respectively. The connecting portions 100 are connected to the connecting portions 64 of the lower side members 30, respectively, by bolts and other members, which are not shown.

FIG. 6 is a perspective view showing a configuration of the front door 200, the front door support system 204, the rear door 202, and the rear door support system 206. As shown in FIG. 6, the front door support system 204 includes a support rod 212 mounted to a front portion of the lower side member 30 to extend vertically, and two mounting portions 214 provided to a side surface of the support rod 212, such that they are vertically spaced apart from each other. Hinges 240 are mounted to the two mounting portions 214, respectively. The two mounting portions 214 respectively protrude rearward from a side surface of the support rod 212. The two mounting portions 214 are each provided with a hole 214*a* extending vertically. A pin 216 is inserted into the hole 214*a*. The front door support system 204 includes a mounting mechanism 210 to which a striker member 268 is mounted. The mounting mechanism 210 includes a base portion 217 (FIG. 9) provided on a side surface of the second lower pillar pipe element 62*b*, a frame portion 218 formed by bending a pipe member in substantially U-shape, and a plate portion 220 welded to the frame portion 218. The frame portion 218 protrudes forward from a side surface of the base portion 217. The plate portion 220 is positioned forward relative to the second lower pillar pipe element 62*b*. The plate portion 220 is provided with two holes 220*a*, which are spaced apart from each other in the forward and rearward direction. Bolts 278 (FIG. 11) are inserted into the two holes 220*a*, respectively.

As shown in FIG. 6, the rear door support system 206 includes two mounting portions 228 provided to a side surface of the second lower pillar pipe element 62*b* to be vertically spaced apart from each other. Hinges 240 are mounted to the two mounting portions 228, respectively. The two mounting portions 228 respectively protrude rearward from a side surface of the second lower pillar pipe element 62*b*. The two mounting portions 228 are each provided with a hole 228*a* extending vertically. A pin 230 is inserted into the hole 228*a*. The rear door support system 206 includes a mounting mechanism 226 to which the striker member 268 is mounted. The mounting mechanism 226 includes a base portion (not shown) provided on a side surface of the third lower pillar pipe element 62*c*, a frame portion 232 formed by bending a pipe member in substantially U-shape, and a plate portion 234 welded to the frame portion 232. The frame portion 232 protrudes forward from a side surface of the base portion (not shown). The plate portion 234 is positioned forward relative to the third lower pillar pipe element 62*c*. The plate portion 234 is provided with two holes 234*a* which are spaced apart from each other in the forward and rearward direction. Bolts 278 (FIG. 11) are inserted into the two holes 234*a*, respectively.

As shown in FIGS. 1 and 2, each of the seats S1 to S4 includes the seat frame 14, the seat bottom 16, and the seat backrest 18. In this embodiment, the seat frames 14 of the left seats S1 and S3 have substantially the same structure, while the seat frames 14 of the right seats S2 and S4 have substantially the same structure. The seat frame 14 of the left seat S1 and the seat frame 14 of the right seat S2 are substantially symmetric in the rightward and leftward direction, while the seat frame 14 of the left seat S3 and the seat frame 14 of the right seat S4 are substantially symmetric in the rightward and leftward direction. The seat bottoms 16 of the seats S1 to S4 have substantially the same structure and the seat backrests 18 of the seats S1 to S4 have substantially the same structure. The seat frame 14, the seat bottom 16 and the seat backrest 18 of the seat S1 will be described hereinafter, by way of example. Description of the seats S2 and S3 is omitted.

Figure 7:
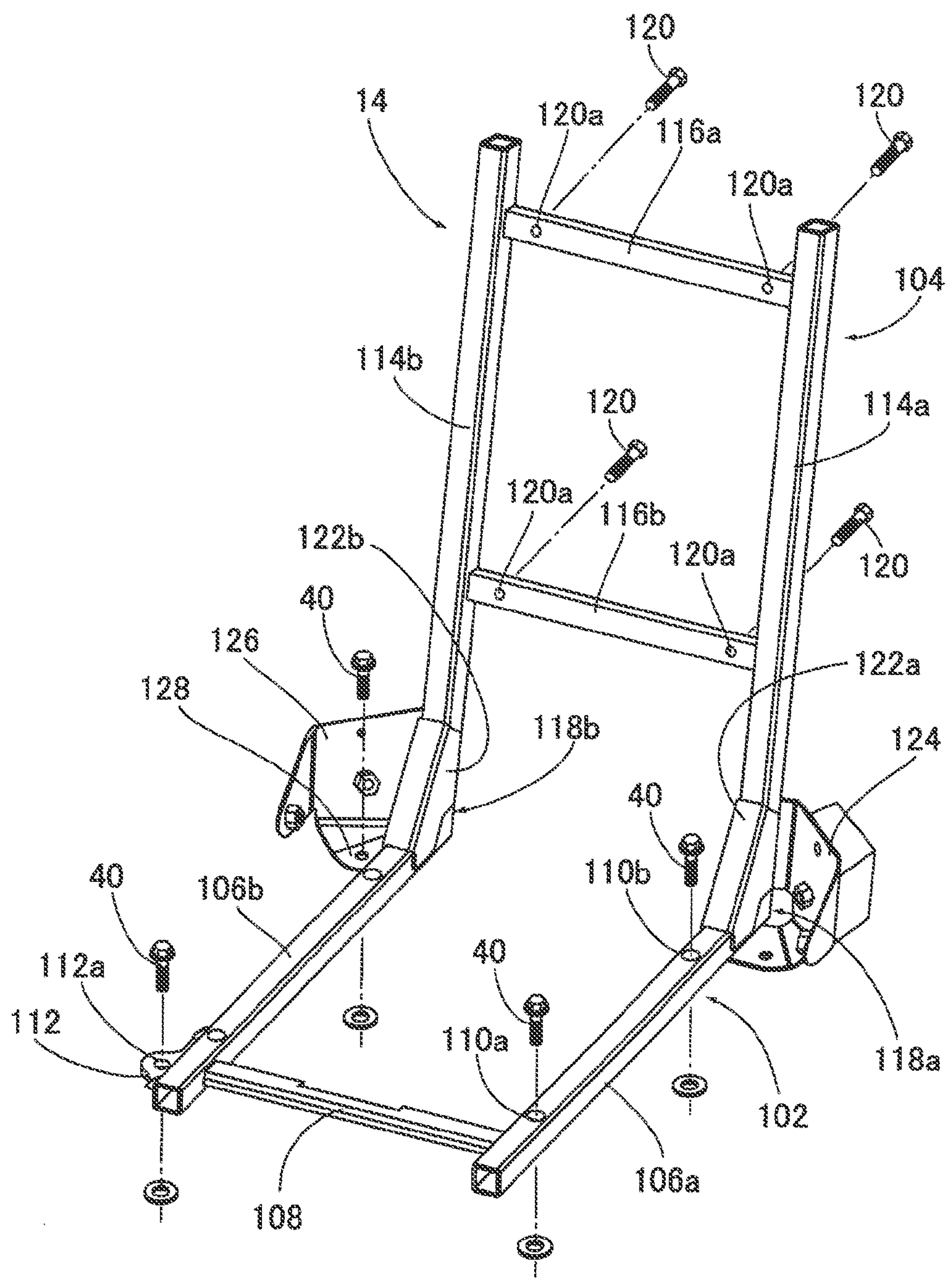
FIG. 7 is a perspective view showing a configuration of a seat frame.
Figure 8:
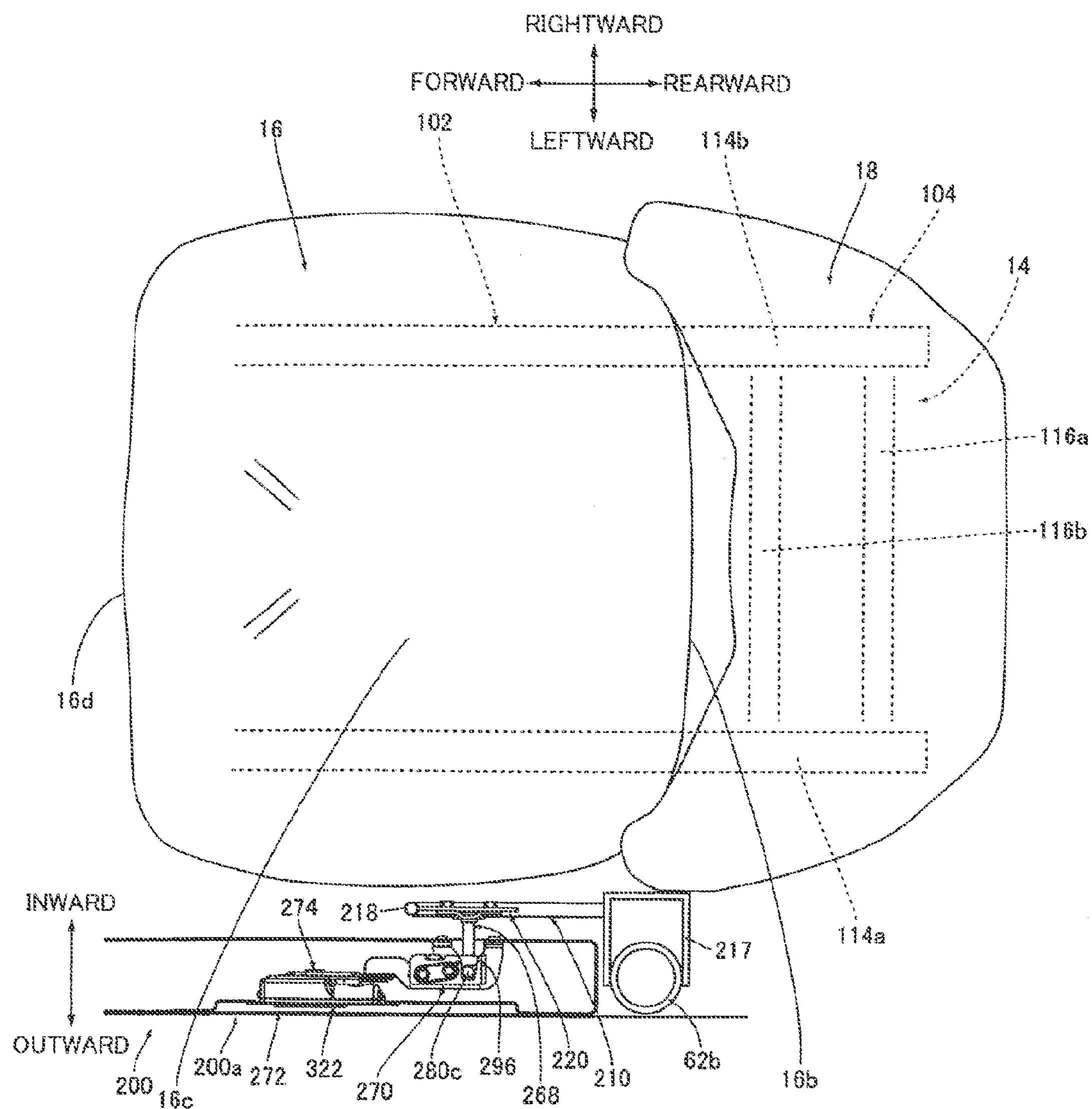
FIG. 8 is a plan view showing a positional relationship among a door body, a latch device and a seat bottom.

FIG. 7 is a perspective view showing a configuration of the seat frame 14. FIG. 8 is a plan view showing a positional relationship among the door body 202*a*, the latch device 242, and the seat bottom 16. As shown in FIG. 7, the seat frame 14 includes a seat bottom support member 102 for supporting the seat bottom 16 (FIG. 8), and a seat backrest support member 104 for supporting the seat backrest 18 (FIG. 8).

As shown in FIG. 7, the seat bottom support member 102 includes two support pipes 106*a* and 106*b*, arranged to extend in the forward and rearward direction, substantially in parallel with each other and a coupling pipe 108 for coupling the two support pipes 106*a* and 106 to each other. The support pipes 106*a* and 106*b* are rectangular pipes having rectangular cross-sections. As shown in FIG. 3, the length of the support pipes 106*a* and 106*b* is greater than a distance between the support pipe 38 of the main frame 22 and the cross member 80 of the sub-frame 24. As shown in FIG. 7, the support pipe 106*a* is provided with holes 110*a* and 110*b*, which are spaced apart from each other in the forward and rearward direction. Bolts 40 are inserted into the holes 110*a* and 110*b*, respectively. A plate 112 is attached to an outer side surface of a front end portion of the support pipe 106*b*, and has a hole 112*a* into which the bolt 40 is inserted.

As shown in FIG. 7, the seat backrest support member 104 includes two support pipes 114*a* and 114*b*, arranged to extend vertically and substantially in parallel with each other, and two coupling pipes 116*a* and 116*b* for coupling the two support pipes 114*a* and 114*b* to each other. The support pipes 114*a* and the 114*b* are rectangular pipes having rectangular cross-sections. The support pipe 114*a* is continuous with the support pipe 106*a* of the seat bottom support member 102 via a bent portion 118*a*, while the support pipe 114*b* is continuous with the support pipe 106*b* of the seat bottom support member 102 via a bent portion 118*b*. Each of the two coupling pipes 116*a* and 116*b* has holes 120*a* into which bolts 120 are inserted, respectively.

As shown in FIG. 7, at the bent portion 118*a* or in the vicinity of the bent portion 118*a*, a metal-made reinforcement plate 122*a* for reinforcing the bent portion 118*a*, and a seat belt accommodating portion 124 for accommodating a seat belt (not shown) are provided between the support pipe 106*a* of the seat bottom support member 102 and the support pipe 114*a* of the seat backrest support member 104, and are coupled to the support pipe 106*a* and to the support pipe 114*a*. In this embodiment, the seat belt accommodating portion 124 is a retractor, which winds back the seat belt. At the bent portion 118*b* or in the vicinity of the bent portion 118*b*, a metal-made reinforcement plate 122*b*, for reinforcing the bent portion 118*b*, and a seat belt fastening portion 126, for fastening the seat belt, are provided between the support pipe 106*b* of the seat bottom support member 102 and the support pipe 114*b* of the seat backrest support member 104, and are coupled to the support pipe 106*b* and to the support pipe 114*b*. The reinforcement plate 122*b* has a hole 128 into which the bolt 40 is inserted.

As shown in FIG. 3, when the seat frame 14 is mounted to the vehicle body 12, firstly, the front portions of the two support pipes 106*a* and 106*b* are placed on the support pipe 38 of the main frame 22, and the rear portions thereof are placed on the cross member 80 of the sub-frame 24. Then, as shown in FIG. 7, four bolts 40 are inserted into the holes 110*a*, 110*b*, 112*a*, and 128 of the seat frame 14 and into the holes 42*a*, 88*a*, 42*a*, and 88*a* (FIG. 5) of the vehicle body 12 (FIG. 3) to fasten the seat frame 14 to the vehicle body 12 (FIG. 3). As shown in FIG. 3, in a state where the seat frame 14 is mounted to the vehicle body 12, a space Q is formed below the seat frame 14. As shown in FIG. 1, in this embodiment, a cover 224 is mounted to the opening of the space Q formed below each of the front seats S1 and S2.

As shown in FIG. 3, the seat bottom 16 supports a hip part of the user. An upper surface of the seat bottom 16 has a shape in which both side portions in the vehicle width direction are higher than a center portion in the vehicle width direction to allow the user to be easily seated thereon. Two second engagement mechanisms 142 are provided on a rear portion of a lower surface 16*a* of the seat bottom 16, such that they are spaced apart from each other in the vehicle width direction. The second engagement mechanisms 142 are engaged with the cross member 80 from below. In addition, a first engagement mechanism 144 is provided on a front portion of the lower surface 16*a* of the seat bottom 16, and is engaged with the coupling pipe 108 (FIG. 7) of the seat frame 14 (FIG. 7) from below. As shown in FIG. 3, when the seat bottom 16 is mounted to the seat frame 14, the second engagement mechanisms 142 are brought into contact with the cross member 80 from a forward direction, and are engaged with the cross member 80, and the first engagement mechanism 144 is engaged with the coupling pipe 108 (FIG. 7). As shown in FIG. 8, in a state where the seat bottom 16 is mounted to the seat frame 14, the second lower pillar pipe element 62*b* is positioned laterally in the vehicle width direction relative to a rear end portion 16*b* of the seat bottom 16, and the mounting mechanism 210 of the front door support system 204 (FIG. 6) is positioned laterally in the vehicle width direction relative to a portion of the seat bottom 16, which is forward relative to the rear end portion 16*b* of the seat bottom 16.

As shown in FIG. 8, the seat backrest 18 supports a back of the user seated on the seat bottom 16. The seat backrest 18 is provided on a back surface thereof with threaded holes (not shown) into which the bolts 120 (FIG. 7) are threadingly engaged. As shown in FIG. 8, when the seat backrest 18 is mounted to the seat frame 14, the support pipes 114*a* and 114*b*, and the coupling pipes 116*a* and 116*b* of the seat frame 14 (FIG. 7) are brought into abutment with the back surface of the seat backrest 18. Following this, the bolts 120 (FIG. 17) are inserted into the plurality of holes 120*a* (FIG. 7) provided in the coupling pipes 116*a* and 116*b*, and are threadingly engaged with the threaded holes (not shown) provided on the seat backrest 18.

As shown in FIG. 4, in the vehicle body 12, a space, located between the first lower pillar pipe element 62*a* and the second lower pillar pipe element 62*b*, is continuous with a space, located between the first upper pillar pipe element 98*a* and the second upper pillar pipe element 98*b*, to form each of entrances R1 and R2. Through the entrance R1 or R2, the user can get into and get out of the seat S1 or S2. A space, located between the second lower pillar pipe element 62*b* and the third lower pillar pipe element 62*c*, is continuous with a space, located between the second upper pillar pipe element 98*b* and the third upper pillar pipe element 98*c*, to form each of entrances R3 and R4. Through the entrance R3 or R4, the user can get into and get out of the seat S3 or S4. As shown in FIG. 1, the front doors 200 are openably mounted to the entrances R1 and R2, respectively, while the rear doors 202 are openably mounted to the entrances R3 and R4, respectively.

As shown in FIG. 6, the front door 200 includes a door body 200*a* for opening and closing a part of the entrance R1 or R2, hinges 240 for coupling the door body 200*a* to the vehicle body 12, such that the door body 200*a* is rotatable around the hinges 240, and a latch device 242 for retaining the door body 200*a* in a state where the door body 200*a* closes a part of the entrance R1 or R2. The rear door 202 includes a door body 202*a* for opening and closing a part of the entrance R3 or R4, hinges 240 for coupling the door body 202*a* to the vehicle body 12, such that the door body 202*a* is rotatable around the hinges 240, and a latch device 242 for retaining the door body 202*a* in a state where the door body 202*a* closes a part of the entrance R3 or R4. The left front door 200 and the right front door 200 are substantially symmetric in the rightward and leftward direction, while the left rear door 202 and the right rear door 202 are substantially symmetric in the rightward and leftward direction. The left front door 200 is substantially identical to the left rear door 202, except for a difference in shape between the door body 200*a* and the door body 202*a*. Accordingly, hereinafter, the left front door 200 will be described, and the right front door 200, the left rear door 202 and the right rear door 202 will not be described. It should be noted that in the rear door 202, the constituents corresponding to those of the front door 200 are designated by the same reference symbols given to those of the rear door 202.

Figure 9:
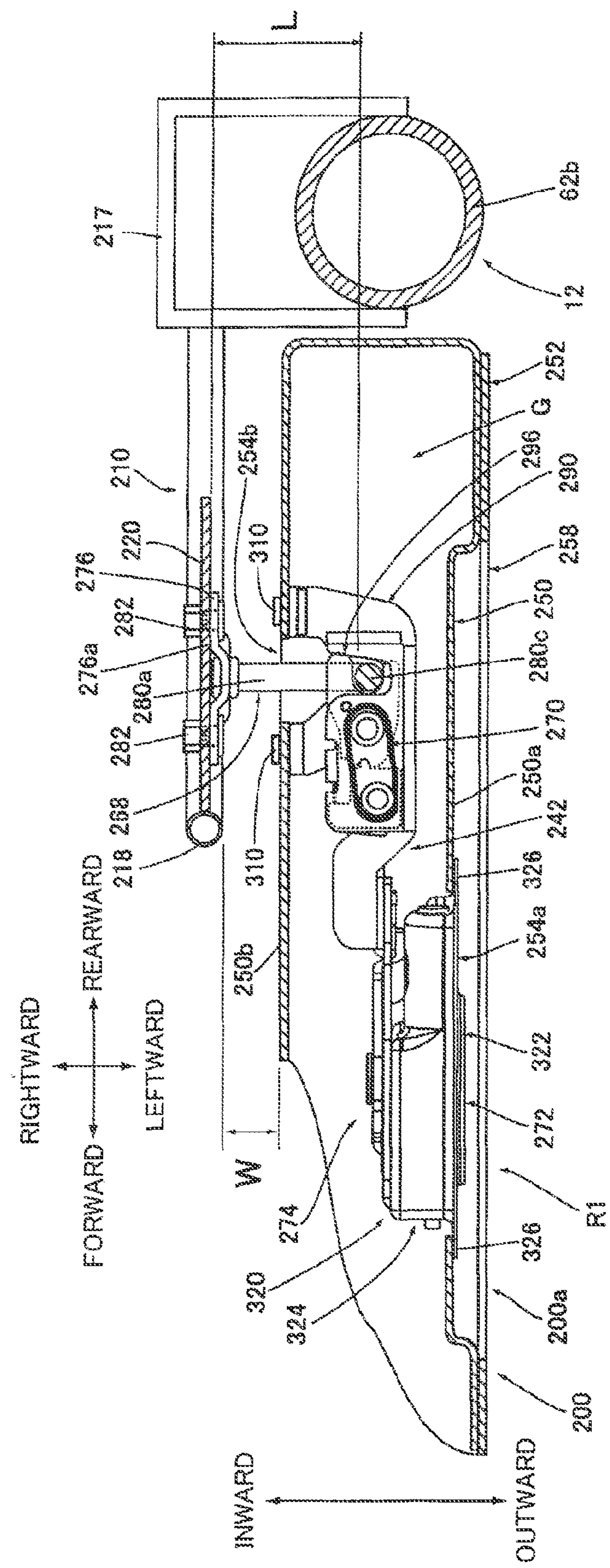
FIG. 9 is an enlarged plan view showing a configuration of the door body and the latch device.
Figure 10:
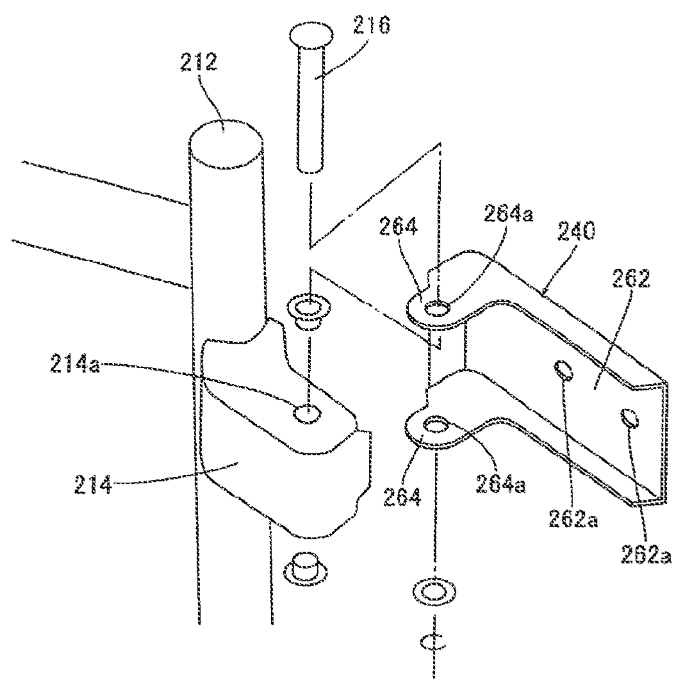
FIG. 10 is a perspective view showing a configuration of a hinge.
Figure 11:
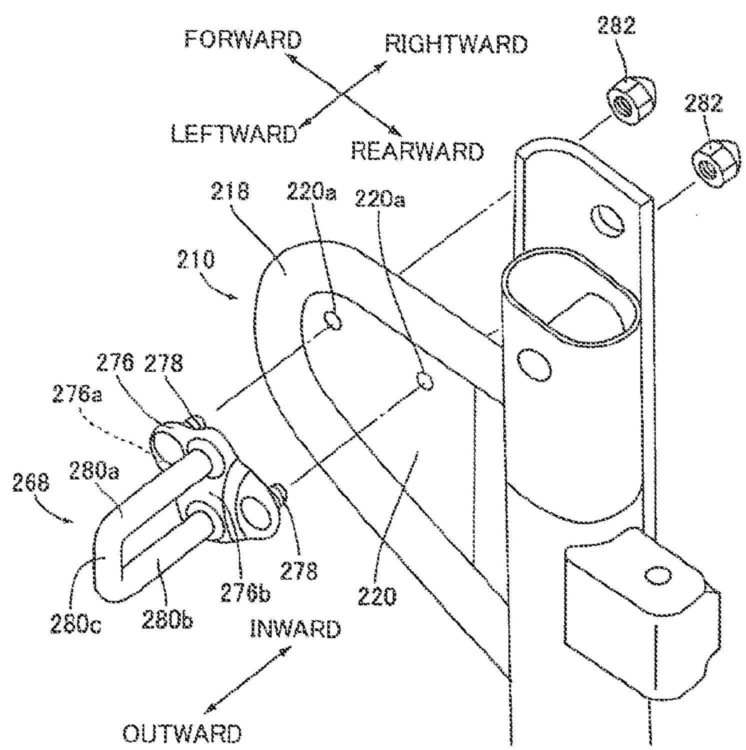
FIG. 11 is a perspective view showing a configuration of a striker member of the latch device.

FIG. 9 is an enlarged plan view showing a configuration of the door body 200*a* and the latch device 242. FIG. 10 is a perspective view showing a configuration of the hinge 240. FIG. 11 is a perspective view showing a configuration of the striker member 268 of the latch device 242. As shown in FIG. 1, the door body 200*a* of the front door 200 is adapted to open and close a part (in this embodiment, a lower portion) of the entrance R1. As shown in FIG. 9, the door body 200*a* includes a hollow base body 250 having an internal space G, and a decorative panel 252 attached to an outer surface of the base body 250 in the vehicle width direction. A first hole 254*a* is formed on an outer wall 250*a* in the vehicle width direction, in the rear portion of the base body 250. A second hole 254*b* is formed on an inner wall 250*b* in the vehicle width direction, in the rear portion of the base body 250. A hole 258 is formed in a portion of the rear portion of the decorative panel 252, which corresponds to at least the first hole 254*a*. The first hole 254*a*, the second hole 254*b*, and the hole 258 are designed to be positioned according to a location of the latch device 242. As shown in FIG. 6, a plurality of holes 260 are formed on the outer wall 250*a* (FIG. 9) and the inner wall 250*b* (FIG. 9) at the front portion of the base body 250. Bolts 256 are inserted into the holes 260 to mount the hinges 240. In the front portion of the decorative panel 252, a portion corresponding to the holes 260 is cut.

As shown in FIG. 10, the hinge 240 includes a plate-shaped mounting portion 262, having two holes 262*a* into which the bolts 256 (FIG. 6) are inserted, and a pair of bearings 264 provided integrally with the mounting portion 262. The pair of bearings 264 are opposite to each other in a vertical direction. The pair of bearings 264 have holes 264*a*, respectively, into which a pin 216 is inserted. As shown in FIG. 6, when the hinge 240 is mounted to the door body 200*a*, the bolts 256 are inserted into the holes 260 of the door body 200*a* and into the holes 262*a* of the hinge 240, and nuts 266 are threadingly engaged with the bolts 256, respectively. As shown in FIG. 10, when the hinge 240 is mounted to the vehicle body (FIG. 4), the pair of bearings 264 are positioned vertically at both sides of the mounting portion 214, and the pin 216 is inserted into the holes 264*a* of the bearings 264, and into the hole 214*a* of the mounting portion 214.

Figure 12:
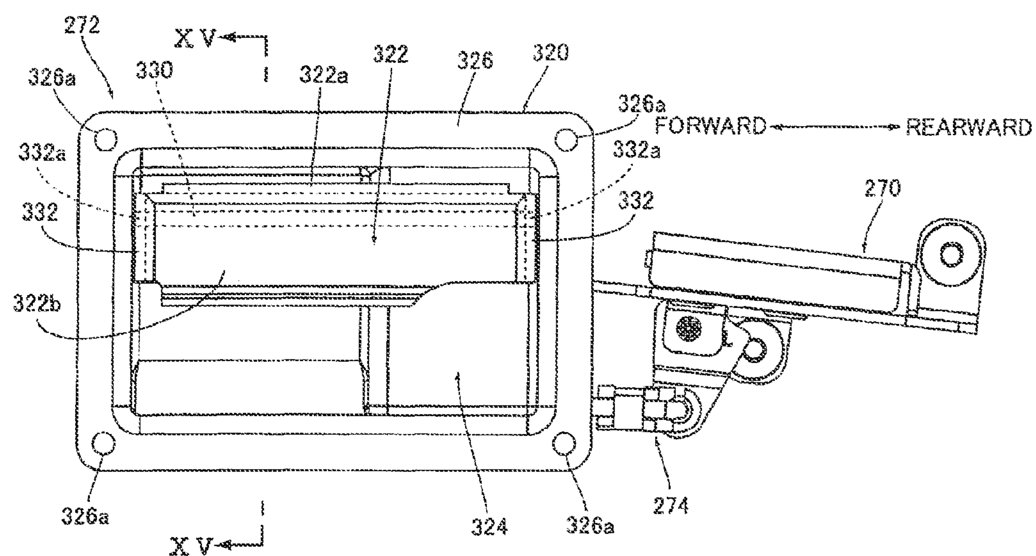
FIG. 12 is a front view showing a configuration of a latch unit, an operation unit and a force transmission mechanism in the latch device.
Figure 13:
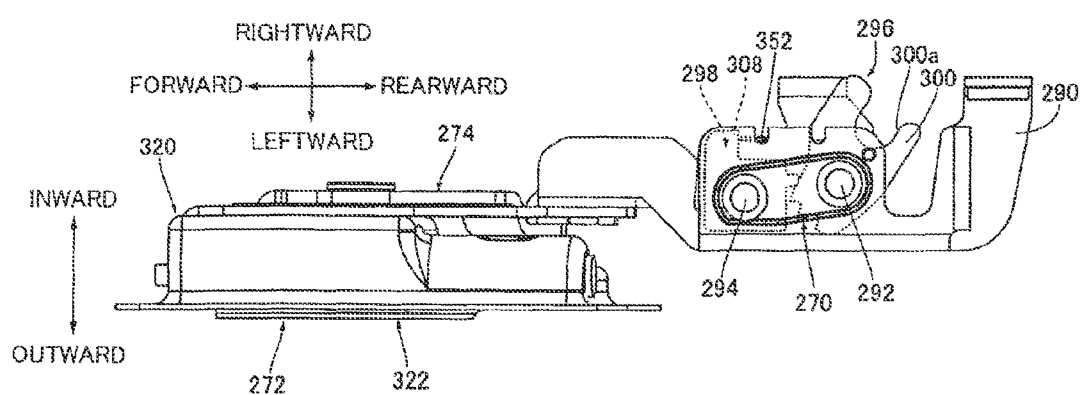
FIG. 13 is a plan view showing a configuration of the latch unit, the operation unit and the force transmission mechanism in the latch device.
Figure 14:
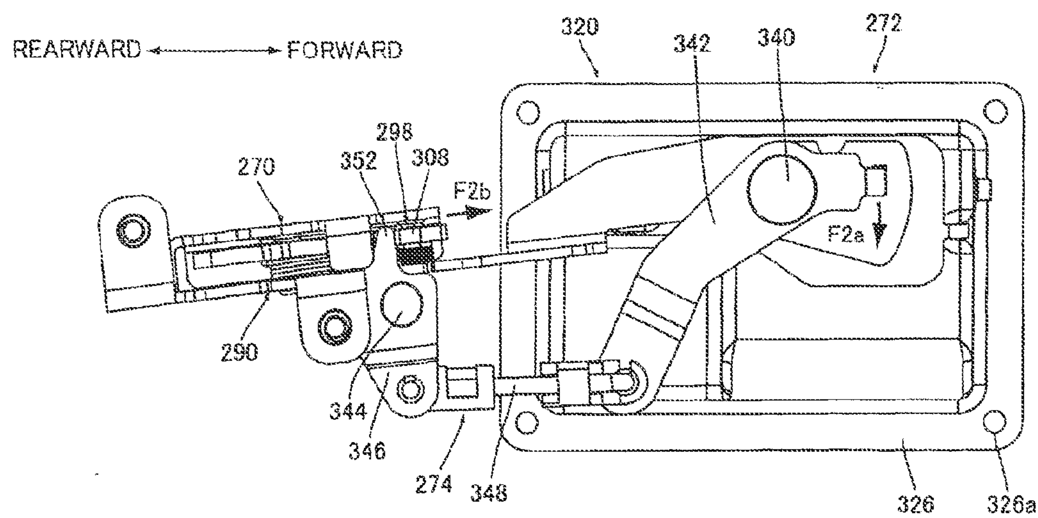
FIG. 14 is a rear view showing a configuration of the latch unit, the operation unit and the force transmission mechanism in the latch device.
Figure 15:
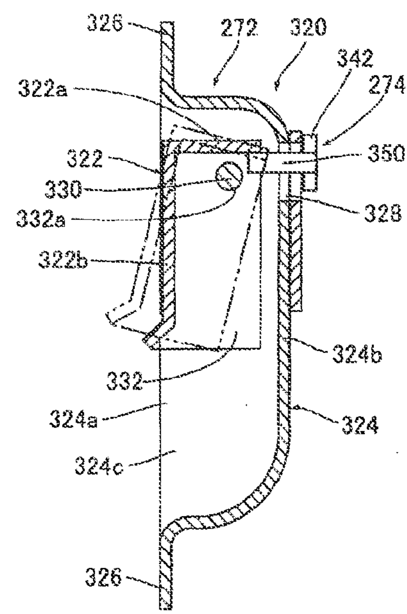
FIG. 15 is a cross-sectional view taken along line XV-XV of FIG. 12.
Figure 16:
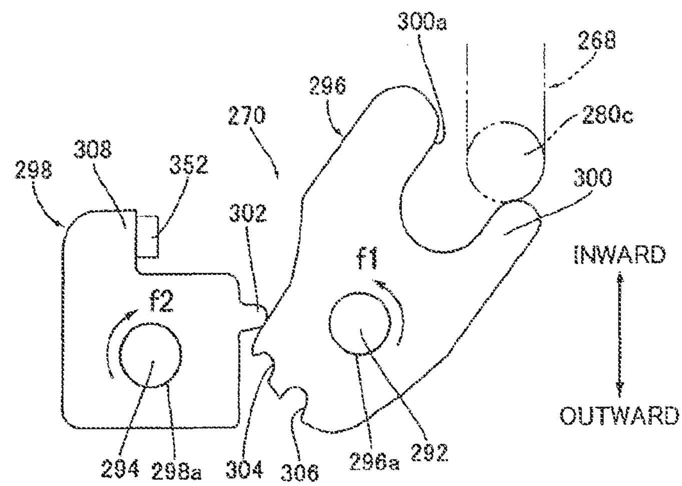
FIG. 16 is a plan view showing a configuration of a latch member of the latch device.

FIG. 11 is a perspective view showing a configuration of the striker member 268 of the latch device 242 (FIG. 6). FIG. 12 is a front view showing a configuration of a latch unit 270, an operation unit 272, and a force transmission mechanism 274 in the latch device 242. FIG. 13 is a plan view showing a configuration of the latch unit 270, the operation unit 272, and the force transmission mechanism 274 in the latch device 242. FIG. 14 is a rear view showing a configuration of the latch unit 270, the operation unit 272, and the force transmission mechanism 274 in the latch device 242. FIG. 15 is a cross-sectional view taken along line XV-XV of FIG. 12. FIG. 16 is a plan view showing a configuration of the latch member of the latch device.

As shown in FIG. 9, the latch device 242 includes the striker member 268 provided at the vehicle body 12, to protrude outward in the vehicle width direction; the latch unit 270, which is provided at the door body 200*a* and includes a latch member 296 actuated to switch between a first state (FIG. 9) in which the latch member 296 engages with the striker member 268 and a second state (FIG. 16) in which the latch member 296 disengages from the striker member 268; the operation unit 272, which is provided at the door body 200*a* and includes an operation member 322 operated by the user to input a force for actuating the latch member 296; and the force transmission mechanism 274, for transmitting a force input by operation member 322 to the latch member 296.

As shown in FIG. 11, the striker member 268 includes a base portion 276 having a contact surface 276*a*, which contacts the plate portion 220 of the mounting mechanism 210, and two bolts 278 provided at the base portion 276, so as to protrude inward in the vehicle width direction from the contact surface 276*a*. The striker member 268 further includes two rod-like leg portions 280*a* and 280*b* provided at the base portion 276, so as to protrude outward in the vehicle width direction from a surface 276*b* of the base portion 276, which is at an opposite side of the contact surface 276*a*, and an engagement portion 280*c* engaged with the latch member 296 (FIG. 16). The two leg portions 280*a* and 280*b* are vertically spaced apart from each other and extend in parallel with each other. The engagement portion 280*c* extends substantially vertically between tip end portions of the two leg portions 280*a* and 280*b*. As shown in FIG. 11, when the striker member 268 is mounted to the mounting mechanism 210, the two bolts 278 of the striker member 268 are inserted into the two holes 220*a* formed on the plate portion 220, and nuts 282 are threadingly engaged with the bolts 278. As shown in FIG. 8, in a state where the striker member 268 is mounted to the mounting mechanism 210, the striker member 268 is positioned laterally in the vehicle width direction relative to the portion of the seat bottom 16, which is forward relative to the rear end portion 16*b* of the seat bottom 16.

As shown in FIG. 9, in a state where the front door 200 is closed, the two leg portions 280*a* and 280*b* (FIG. 11) are disposed to extend in a direction substantially orthogonal to the wall 250*b* of the door body 200*a*. Therefore, when a protruding length L of the striker member 268 is defined as a distance from the contact surface 276*a* of the base portion 276 to the engagement portion 280*c*, the protruding length L is determined by the length of the two leg portions 280*a* and 280*b*. As shown in FIG. 9, in this embodiment, the protruding length L of the striker member 268 is designed so that a shortest distance W between the mounting mechanism 210 and an inner surface (i.e., surface of the wall 250*b*) of the door body 200*a* in the vehicle width direction is not less than 2 cm, in a state where the door body 200*a* closes a part of the entrance R1 (FIG. 1).

As shown in FIG. 13, the latch unit 270 includes a base portion 290 of a substantially plate shape, extending substantially horizontally, a first rotary shaft 292 and a second rotary shaft 294, which are provided at the base portion 290, the latch member 296 rotatably supported by the first rotary shaft 292, and a lock member 298 rotatably supported by the second rotary shaft 294 to inhibit the latch member 296 from rotating.

As shown in FIG. 16, the latch member 296 is of a substantially plate shape, and has a hole 296*a* into which the first rotary shaft 292 is inserted. The latch member 296 has, at a portion of its outer peripheral portion, an engagement portion 300 of a substantially-U shape, which is brought into engagement with the engagement portion 280*c* of the striker member 268 (FIG. 11) from both sides in the vehicle width direction. The latch member 296 has, at a portion of its outer peripheral portion, which is at an opposite side of the engagement portion 300, a first engagement portion 304 of a substantially U-shape and a second engagement portion 306 of a substantially U-shape, which are arranged along a periphery of the latch member 296. The engagement portion 302 of the lock member 298 is engageable with the first engagement portion 304 or the second engagement portion 306. A spring member (not shown) is attached around the first rotary shaft 292 and biases the latch member 296 with a predetermined force f1. The force f1 is directed to cause an opening portion 300*a* of the engagement portion 300 to face inward in the vehicle width direction.

As shown in FIG. 16, the lock member 298 is of a substantially plate shape and has a hole 298*a* into which the second rotary shaft 294 is inserted. The lock member 298 has, at a portion of its outer peripheral portion, a protrusive engagement portion 302, which is engageable with the first engagement portion 304 or the second engagement portion 306 provided at the latch member 296. The lock member 298 has, at another portion of its outer peripheral portion, an input portion 308, with which an output portion 352 of the force transmission mechanism 274 (FIG. 14) makes contact. A spring member (not shown) is attached around the second rotary shaft 294 and biases the lock member 298 with a predetermined force f2. The force f2 is directed to cause the engagement portion 302 to get closer to the latch member 29. As shown in FIG. 9, when the latch unit 270 is mounted to the door body 200*a*, the base portion 290 is fastened to the wall 250*b* of the door body 200*a* using two bolts 310 (FIG. 6). In a state where the base portion 290 is fastened to the wall 250*b*, the latch member 296 is positioned opposite to the second hole 254*b*, formed on the wall 250*b*.

As shown in FIGS. 12 to 15, the operation unit 272 includes a support member 320 and an operation member 322, supported by the support member 320. As shown in FIG. 15, the support member 320 has a body portion 324, having a substantially U-shaped cross-section. An opening portion 324*a* of the body portion 324 faces outward in the vehicle width direction. A flange portion 326 is provided around the opening portion 324*a* and has a plurality of (four in this embodiment) holes 326*a* (FIG. 12). The body portion 324 has a hole 328, on an upper portion of a side wall 324*b*, at an inner side in the vehicle width direction. A rotary shaft 330 is provided between two side walls 324*c* of the body portion 324, which are opposed to each other in the forward and rearward direction, and coupled to the side walls 324*c*.

As shown in FIGS. 12 and 15, the operation member 322 includes a first portion 322*a* of a substantially plate shape, extending substantially horizontally, and a second portion 322*b* of a substantially plate shape, extending downward from an outer edge of the first portion 322*a* in the vehicle width direction. At both ends of each of the first portion 322*a* and the second portion 322*b*, in the forward and rearward direction, two bearings 332 of a substantially plate shape are provided opposite to each other. As shown in FIG. 12, holes 332*a* are formed at upper portions of the two bearings 332, respectively. The operation member 322 is rotatably supported around a rotary shaft 330, inserted into these holes 332*a*. As shown in FIG. 15, in a location inward in the vehicle width direction relative to the rotary shaft 330 inside the body portion 324 and under the first portion 322*a*, an input portion 350 of the force transmission mechanism 274, which is inserted through a hole 328, is disposed. Therefore, when the user pulls a lower end portion of the second portion 322*b* in an outward direction in the vehicle width direction, an inner end portion of the first portion 322*a* in the vehicle width direction is moved downward to press down the input portion 350, as indicated by a two-dotted line.

As shown in FIG. 9, when the operation unit 272 is mounted to the door body 200*a*, the body portion 324 of the support member 320 is fitted into the first hole 254*a*, formed in the wall 250*a*, and the flange portion 326 of the support member 320 contacts the surface of the wall 250*a*. Then, the bolts 334 (FIG. 6) are inserted into the plurality of holes 326*a* (FIG. 12) formed in the flange portion 326, and the flange portion 326 is fastened to the wall 250*a* using these bolts 334.

As shown in FIG. 9, in a state where the operation unit 272 is mounted to the door body 200*a*, the operation member 322 is positioned on an outer surface (in this embodiment, a surface of the wall 250*a*) of the door body 200*a* in the vehicle width direction, and has a one-to-one correspondence with the latch member 296 of the latch unit 270. In other words, the single operation member 322 is provided on the outer surface of the door body 200*a* in the vehicle width direction to correspond to the single latch member 296. As shown in FIG. 9, the operation member 322 is positioned forward relative to the latch member 296. As shown FIG. 8, the operation member 322 is positioned forward relative to a center portion 16*c* of the seat bottom 16 in the forward and rearward direction and laterally in the vehicle width direction relative to a portion of the seat bottom 16, which is behind a front end portion 16*d* of the seat bottom 16.

As shown in FIG. 13, the force transmission mechanism 274 is a link mechanism for transmitting a force F2*a* (FIG. 14) input by the operation member 322 of the operation unit 272 to the input portion 308 of the latch unit 270, positioned behind the operation member 322. As shown in FIG. 14, the force transmission mechanism 274 includes a first arm 342 attached to the support member 320 of the operation unit 272 via a rotary shaft 340, a second arm 346 attached to a base portion 290 of the latch unit 270 via a rotary shaft 344, and a coupling arm 348 for coupling the first arm 342 to the second arm 346.

As shown in FIG. 15, the first arm 342 is provided on a back surface of the body portion 324 of the support member 320. A protrusive input portion 350 extending outward in the vehicle width direction is provided at an input-side end portion of the first arm 342. The input portion 350 is disposed below the first portion 322*a* of the operation member 322. As shown in FIG. 14, the second arm 346 is disposed below the lock member 298 of the latch unit 270. A protrusive output portion 352 is provided at an output-side end portion of the second arm 346 to press the input portion 308 of the lock member 298. As shown in FIG. 16, the output portion 352 is in contact with the input portion 308. As shown in FIG. 14, an input-side end portion of the coupling arm 348 is coupled to an output-side end portion of the first arm 342, such that the coupling arm 348 is rotatable, while an output-side end portion of the coupling arm 348 is coupled to an input-side end portion of the second arm 346. As shown in FIG. 14, upon application of a force F2*a* from the operation member 322 (FIG. 15) to the input portion 350 (FIG. 15), the force F2*a* is transmitted to the output portion 352 through the first arm 342, the coupling arm 348 and the second arm 346, while changing its direction and magnitude, and a force F2*b* is applied from the output portion 352 to the input portion 308.

Figure 17A:
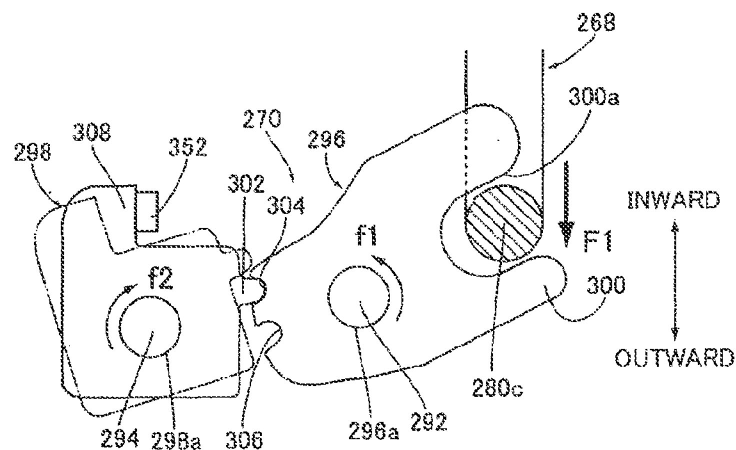
FIGS. 17A and 17B are plan views showing an operation of the latch device when the door body closes an entrance.
Figure 17B:
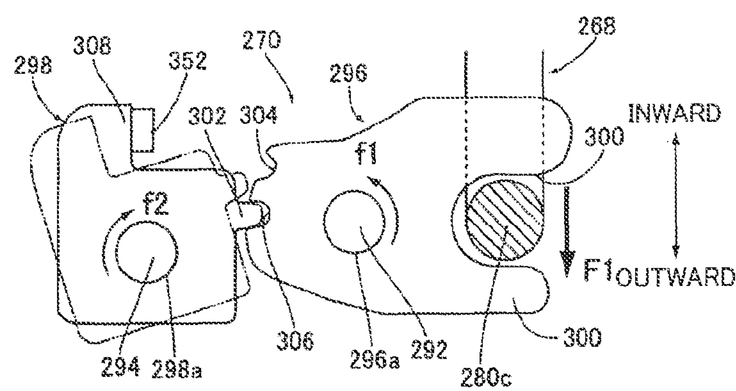

FIGS. 17A and 17B are plan views showing an operation of the latch device 242 (FIG. 6), performed when the door body 200*a* (FIG. 1) closes the entrance R1 (FIG. 1). As shown in FIG. 16, in a state where the door body 200*a* (FIG. 1) opens the entrance R1 (FIG. 1), the latch member 296 of the latch unit 270 is placed in the second state, in which the latch member 296 disengages from the striker member 268 (FIG. 11). When the door body 200*a* (FIG. 1) closes a part of the entrance R1 (FIG. 1), the door body 200*a* (FIG. 1) is rotated to become closer to the vehicle body 12 (FIG. 1). When the door body 200*a* (FIG. 1) reaches a specified position, the latch member 296 contacts the engagement portion 280*c* of the striker member 268 (FIG. 11), as indicated by a two-dotted line in FIG. 16. Thereupon, as shown in FIGS. 17A and 17B, the latch member 296 is rotated against the force f1 of the spring member (not shown) by the force F1, received from the engagement portion 280*c*. According to the rotation of the latch member 296, the engagement portion 302 of the lock member 298 is fitted to the first engagement portion 304 of the latch member 296 temporarily, as shown in FIG. 17A, and then the engagement portion 302 of the lock member 298 is fitted to the second engagement portion 306 of the latch member 296, as shown in FIG. 17B.

Figure 18A:
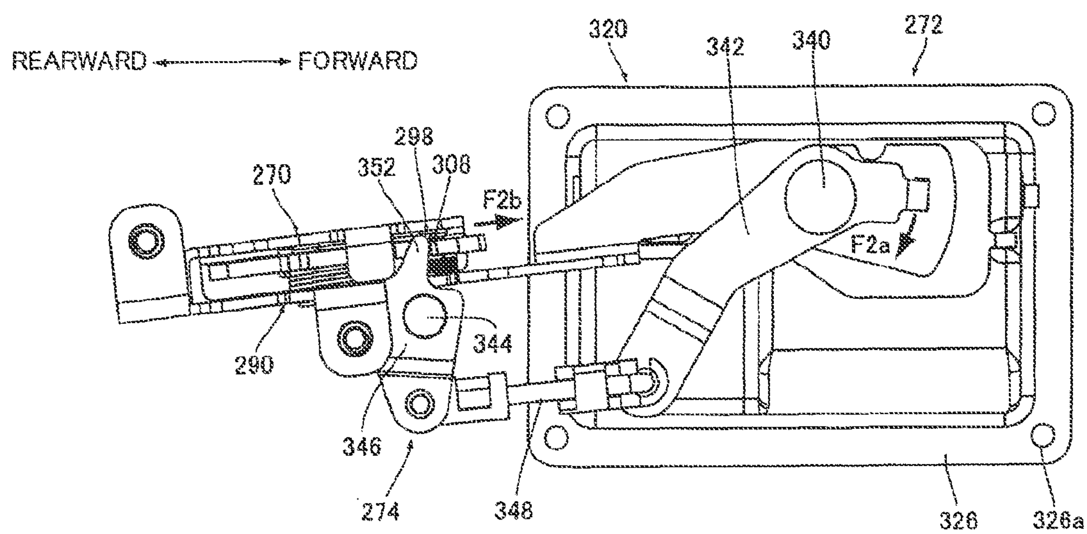
FIGS. 18A and 18B are plan views showing an operation of the latch device when the door body opens the entrance.
Figure 18B:
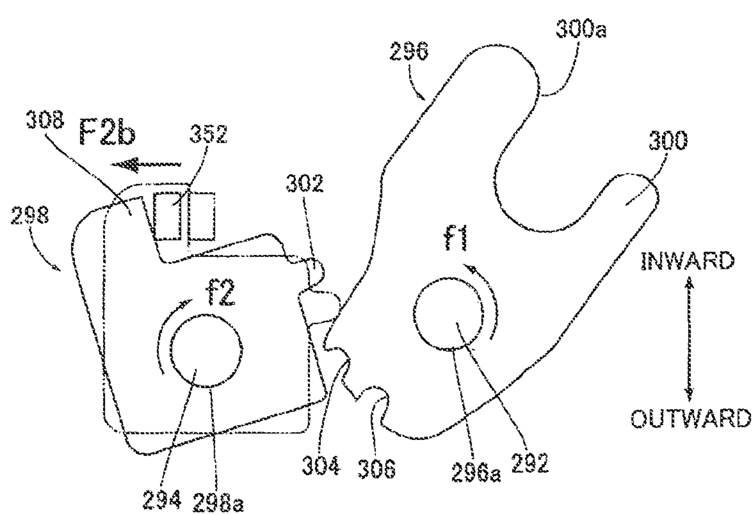

FIGS. 18A and 18B are plan views showing an operation of the latch device 242 (FIG. 6) performed when the door body 200*a* (FIG. 1) opens the entrance R1 (FIG. 1). In a state (FIG. 9) where the door body 200*a* closes the entrance R1, as shown in FIG. 17B, the latch member 296 of the latch unit 270 is placed in the first state (FIG. 9), in which the latch member 296 engages with the striker member 268 (FIG. 11). When a part of the entrance R1 (FIG. 1) is opened, the user pulls the operation member 322 (FIG. 15) outward in the vehicle width direction, so that the latch member 296 (FIG. 16) is switched from the first state (FIG. 9), in which the latch member 296 (FIG. 16) engages with the striker member 268, to the second state (FIG. 16), in which the latch member 296 disengages from the striker member 268.

As shown in FIG. 18A, when the user pulls the operation member 322 (FIG. 15) outward in the vehicle width direction, the force F2*a* is input from the first portion 322*a* (FIG. 15) of the operation member 322 to the input portion 350 (FIG. 15), and the force F2*b* is applied from the output portion 352 to the input portion 308. Thereupon, as shown in FIG. 18B, the lock member 298 is rotated against the force f2 of the spring member (not shown), and the engagement portion 302 of the lock member 298 disengages from the second engagement portion 306 of the latch member 296. Then, the latch member 296 is rotated by the force f1 of the spring member (not shown), and the opening portion 300*a* of the engagement portion 300 faces inward in the vehicle width direction. A rotational angle, with which the latch member 296 is rotated by the force f1, is restricted by a stopper member (not shown). After the latch member 296 has been switched to the second state (FIG. 18B), the user further pulls the operation member 322 (FIG. 15) outward in the vehicle width direction, or the user presses the door body 200*a* (FIG. 9) in a direction from inward to outward in the vehicle width direction to rotate the door body 200*a* (FIG. 9) outward in the vehicle width direction, thereby partially opening a part of the entrance R1.

As shown in FIG. 1, in this embodiment, each of the door body 200*a* of the door 200 and the door body 202*a* of the door 202 does not open and close the entirety of the corresponding entrances R1 to R4, but opens and closes a part of it. Therefore, in a remaining portion of each of the entrances R1 to R4, an opening portion for providing communication between inside the door body 200*a* and outside the door body 200*a* or an opening portion for providing communication between inside the door body 202*a* and outside the door body 202*a* are provided. As shown in FIG. 8, since the operation member 322 is positioned on the outer surface of each of the door body 200*a* and the door body 202*a* in the vehicle width direction, the user seated on any one of the seats S1 to S4 (FIG. 1) can extend his/her hand to an outside space of the door body 200*a* or 202*a* (FIG. 1) in the vehicle width direction through the opening portion, and easily operate the operation member 322.

As shown in FIG. 9, in this embodiment, the operation member 322 is positioned on an outer surface of each of the door body 200*a* and the door body 202*a* (FIG. 1) in the vehicle width direction. As shown FIG. 8, the operation member 322 is positioned forward relative to the center portion 16*c* of the seat bottom 16 in the forward and rearward direction, and laterally in the vehicle width direction relative to the portion of the seat bottom 16, which is behind the front end portion 16*d* of the seat bottom 16. Therefore, the user seated on any one of the seats S1 to S4 (FIG. 1) can extend his/her hand to an outside space of the door body 200*a* or 202*a* (FIG. 1) through the opening portion of one of the entrances R1 to R4 and easily operate the operation member 322 (FIG. 8).

As shown in FIG. 18A, in this embodiment, the force input by the operation member 322 (FIG. 15) is transmitted to the latch unit 270 via the force transmission mechanism 274. Therefore, as shown in FIG. 8, the latch member 296 and the striker member 268 can be positioned laterally in the vehicle width direction relative to the rear portion of the seat bottom 16, although the operation member 322 is positioned laterally in the vehicle width direction relative to the portion of the set bottom 16, which is forward relative to the center portion 16*c* of the seat bottom 16 in the forward and rearward direction. Therefore, the user seated on any one of the seats S1 to S4 can operate the operation member 322 more easily while preventing the latch member 296 from interfering with the user's operation of getting into or out of the vehicle.

As shown in FIG. 9, in this embodiment, the protruding length L of the striker member 268 is designed so that the minimum distance W, between the mounting mechanism 210 and the inner surface of the door body 200*a* or 202*a* (FIG. 1) in the vehicle width direction, is not less than 2 cm. Therefore, a cloth, an umbrella, a bag, etc is prevented from getting caught or stuck in a gap between the door body 200*a* or 200*b* and the mounting mechanism 210.

As shown in FIGS. 17A and 17B, since in this embodiment, the rotatable latch member 296 is used, the latch member 296 can be engaged with the striker member 268

Although in this embodiment, a link mechanism is used as the force transmission mechanism 274 for transmitting the force input by the operation member 322 (FIG. 15) to the input portion 308, as shown in FIG. 14, other mechanism such as a cam mechanism may be used. Although the four seats S1 to S4 are arranged at the front and rear sides and at the right and left sides in the above embodiment as shown in FIG. 1, the number and arrangement of the seats may be suitably changed as desired. For example, only the seats S1 and S2 may be arranged side by side at the right and left sides, or otherwise only the seats S1 and S3 may be arranged at the front and rear sides in a two-seated utility vehicle.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:

a vehicle body including a main frame to which an engine is mounted, a seat mounted to the main frame, and an entrance through which a user, to be seated on the seat, gets into and out of the vehicle; and a door including a door body for opening and closing a first portion of the entrance, a hinge for coupling the door body to the vehicle body such that the door body is rotatable around the hinge, and a latch device for retaining the door body in a state where the door body closes the first portion of the entrance, wherein:

the latch device including a striker member mounted to the vehicle body to protrude outward in a vehicle width direction, a latch member attached to the door body and actuated to switch between a first state where the latch member engages with the striker member and a second state where the latch member disengages from the striker member, and an operation member attached to the door body to operate the latch member; and the operation member being positioned on an outer surface of the door body in the vehicle width direction such that a lower end portion of the operation member is rotatable outward in the vehicle width direction around a rotary shaft, and the latch member is switched from the first state to the second state responsive to rotation of the lower end portion of the operation member outward in the vehicle width direction; and a second portion of the entrance located above the door body, where the second portion of the entrance includes an opening portion that would allow a user seated on the seat to extend a hand from an inward space of the door body to an outward space of the door body.

2. The utility vehicle according to claim 1, wherein:

the seat includes a seat bottom;

the latch device includes a force transmission mechanism for transmitting a force input by the operation member to the latch member;

the striker member is positioned laterally in the vehicle width direction relative to a rear portion of the seat bottom; and the operation member is positioned forward relative to the latch member.

3. The utility vehicle according to claim 1, wherein:

the vehicle body includes a mounting mechanism to which the striker member is mounted; and a protruding length of the striker member is set so that there is a gap between the mounting mechanism and an inner surface of the door body in the vehicle width direction in a state where the door body closes the part of the entrance.

4. The utility vehicle according to claim 1, wherein:

the seat includes a seat bottom; and the operation member is positioned forward relative to a center portion of the seat bottom in the forward and rearward direction, and laterally in the vehicle width direction relative to a portion of the seat bottom which is behind a front end portion of the seat bottom.

5. The utility vehicle according to claim 1, wherein:

the latch member has an engagement portion; and the latch member is pressed by the striker member and rotated to engage the engagement portion with the striker member.

* * * * *